US012626131B2

(12) United States Patent
Wang et al.

(10) Patent No.: US 12,626,131 B2
(45) Date of Patent: May 12, 2026

(54) COMPUTER-IMPLEMENTED METHODS AND SYSTEMS FOR COMPRESSING RECURRENT NEURAL NETWORK (RNN) MODELS AND ACCELERATING RNN EXECUTION IN MOBILE DEVICES TO ACHIEVE REAL-TIME INFERENCE

(71) Applicants: Northeastern University, Boston, MA (US); College of William & Mary, Williamsburg, VA (US)

(72) Inventors: Yanzhi Wang, Newton Highlands, MA (US); Peiyan Dong, Boston, MA (US); Zhengang Li, Boston, MA (US); Bin Ren, Jamestown, VA (US); Wei Niu, Jamestown, VA (US)

(73) Assignees: Northeastern University, Boston, MA (US); College of William & Mary, Williamsburg, VA (US)

( * ) Notice: Subject to any disclaimer, the term of this patent is extended or adjusted under 35 U.S.C. 154(b) by 936 days.

(21) Appl. No.: 17/795,145

(22) PCT Filed: Jan. 25, 2021

(86) PCT No.: PCT/US2021/014866

§ 371 (c)(1),
(2) Date: Jul. 25, 2022

(87) PCT Pub. No.: WO2021/151056

PCT Pub. Date: Jul. 29, 2021

(65) Prior Publication Data

US 2023/0056315 A1     Feb. 23, 2023

Related U.S. Application Data

(60) Provisional application No. 62/965,275, filed on Jan. 24, 2020.

(51) Int. Cl.
*G06N 3/082* (2023.01)

(52) U.S. Cl.
CPC .................................... *G06N 3/082* (2013.01)

(58) Field of Classification Search
None
See application file for complete search history.

(56) References Cited

U.S. PATENT DOCUMENTS 8,700,233 B1 * 4/2014 Doman ................... B64C 33/02
                                                                701/4
10,380,997 B1 * 8/2019 Ward ...................... G10L 15/02
                          (Continued)

FOREIGN PATENT DOCUMENTS

CN          105799932 B      11/2017
CN          111099016 A       5/2020
                          (Continued)

OTHER PUBLICATIONS

"A systematic DNN wegith pruning framework using alterating direction method of multipliers", https://arxiv.org/pdf/1804.03294, Zhang et al, Jul. 25, 2018 (Year: 2018).*
                          (Continued)

*Primary Examiner* — Haimei Jiang
(74) *Attorney, Agent, or Firm* — Foley Hoag LLP; Dana M. Gordon; Erik A. Huestis

(57) ABSTRACT

A recurrent neural network (RNN) acceleration framework leverages both a block-based pruning approach and compiler optimizations to accelerate RNN inference on mobile devices.

14 Claims, 12 Drawing Sheets

Load Redundant Elimination

Matrix Reorder

(56) References Cited

U.S. PATENT DOCUMENTS

| | | | | |
|---|---|---|---|---|
| 2017/0076196 A1* | 3/2017 | Sainath | .................. | G06N 3/044 |
| 2018/0082181 A1* | 3/2018 | Brothers | ................ | G06N 3/045 |
| 2019/0130272 A1* | 5/2019 | Yosinski | ................ | G06N 3/082 |

FOREIGN PATENT DOCUMENTS

| | | |
|---|---|---|
| WO | WO-2021/146569 A1 | 7/2021 |
| WO | WO-2021/151056 A1 | 7/2021 |

OTHER PUBLICATIONS

International Preliminary Report on Patentability for International Application No. PCT/US2021/014866 dated Aug. 4, 2022.
International Search Report and Written Opinion for International Application No. PCT/US2021/013655 dated Apr. 9, 2021.
International Search Report and Written Opinion for International Application No. PCT/US2021/014866 mailed Apr. 12, 2021.
Mateti., "Flapping Wing Mechanisms for Pico Air Vehicles Using Piezoelectric Actuators," The Pennsylvania State University the Graduate School: 147 pages (2012).
Ramezani et al., "Mechanism Design of a Bio-inspired Armwing Mechanism for Mimicking Bat Flapping Gait," Biomechatronics Intelligent Robotics Lab, retrieved online <https://www.youtube.com/watch?v=IG4G0Ra4TkU>: 1 page (2020).
Zhang et al., "Systematic Weight Pruning of DNNS using alternating direction method of multipliers," Workshop Track—ICLR, (4 pages) (2018).

* cited by examiner $$\mathbf{z}_t = \sigma(\mathbf{W}_{iz}\mathbf{x}_t + \mathbf{W}_{hz}\mathbf{h}_{t-1} + \mathbf{b}_z),$$

$$\mathbf{r}_t = \sigma(\mathbf{W}_{ir}\mathbf{x}_t + \mathbf{W}_{hr}\mathbf{h}_{t-1} + \mathbf{b}_r),$$

$$\widetilde{\mathbf{h}}_t = \theta(\mathbf{W}_{ig}\mathbf{x}_t + \mathbf{W}_{hg}(\mathbf{r}_t \odot \mathbf{h}_{t-1})),$$

$$\mathbf{h}_t = (1 - \mathbf{z}_t) \odot \mathbf{h}_{t-1} + \mathbf{z}_t \odot \widetilde{\mathbf{h}}_t$$

FIG. 5

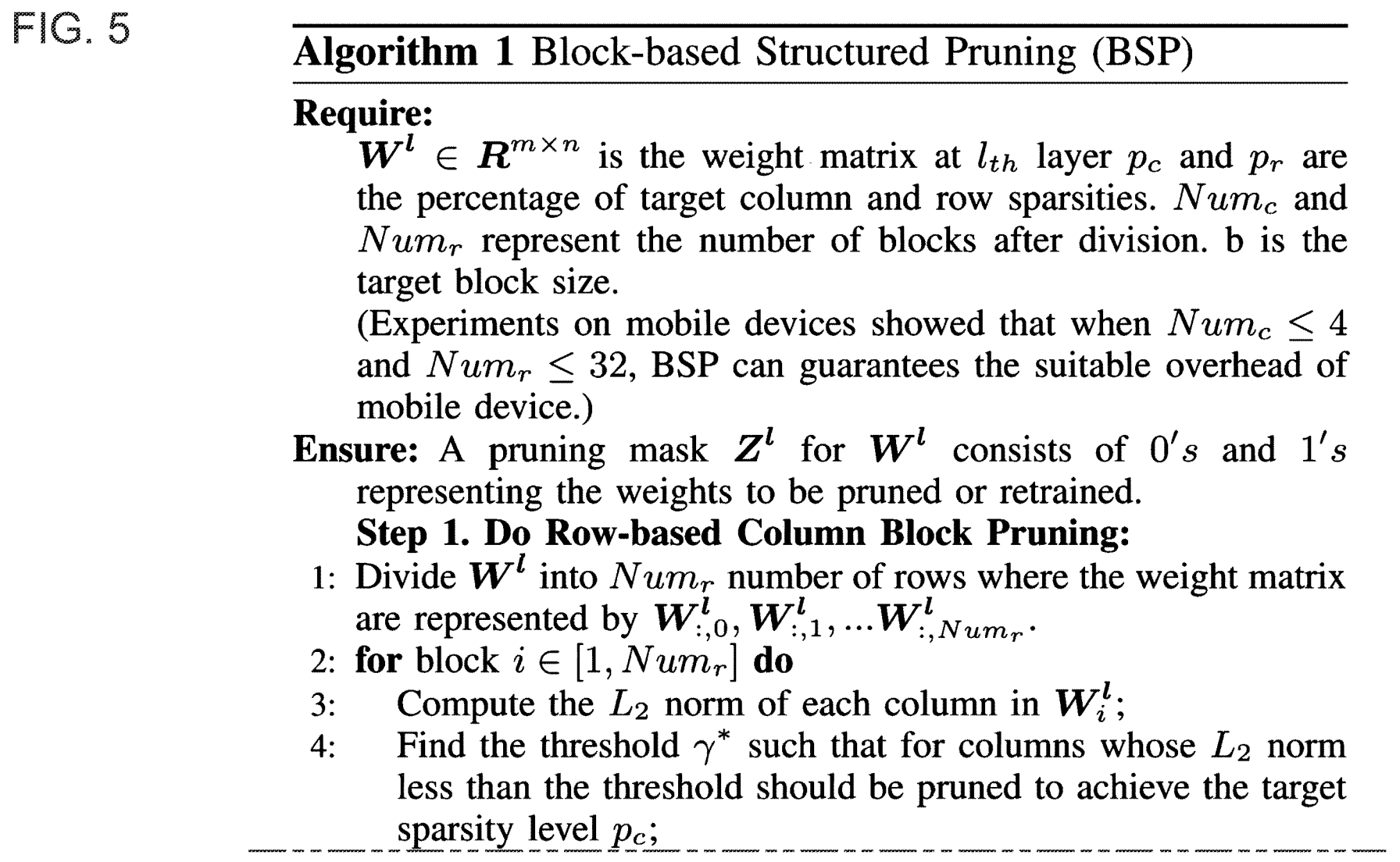

Algorithm 1 Block-based Structured Pruning (BSP)

Require:

$W^l \in R^{m \times n}$ is the weight matrix at $l_{th}$ layer $p_c$ and $p_r$ are the percentage of target column and row sparsities. $Num_c$ and $Num_r$ represent the number of blocks after division. b is the target block size.

(Experiments on mobile devices showed that when $Num_c \leq 4$ and $Num_r \leq 32$, BSP can guarantees the suitable overhead of mobile device.)

Ensure: A pruning mask $Z^l$ for $W^l$ consists of $0's$ and $1's$ representing the weights to be pruned or retrained.

Step 1. Do Row-based Column Block Pruning:

1:   Divide $W^l$ into $Num_r$ number of rows where the weight matrix are represented by $W^l_{:,0}, W^l_{:,1}, ....W^l_{:,Num_r}$.

2:   for block $i \in [1, Num_r]$ do

3:     Compute the $L_2$ norm of each column in $W^l_i$;

4:     Find the threshold $\gamma^*$ such that for columns whose $L_2$ norm less than the threshold should be pruned to achieve the target sparsity level $p_c$;

FIG. 5 (cont.)

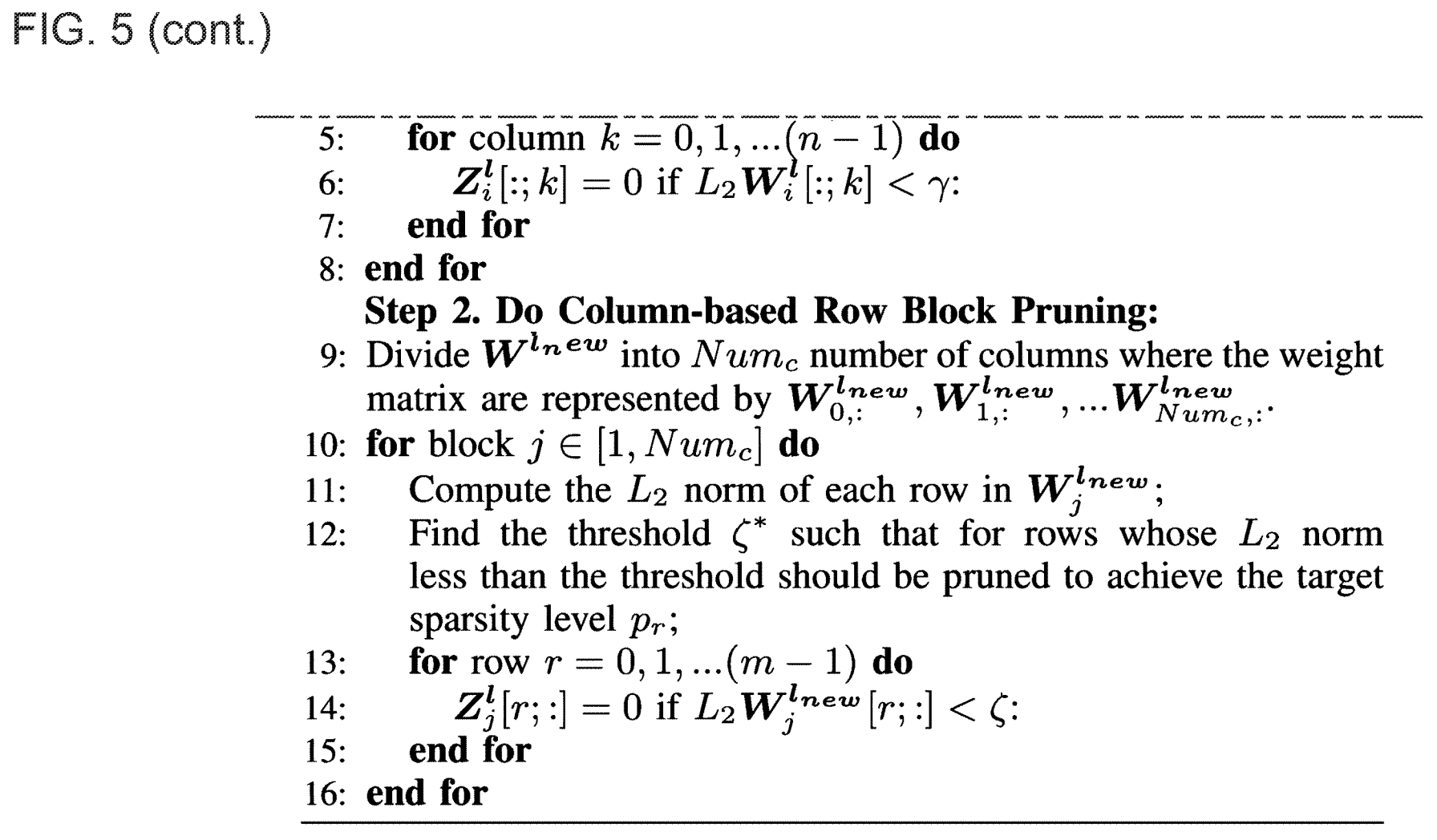

5:     for column $k = 0, 1, \ldots (n-1)$ do

6:         $Z_i^l[:; k] = 0$ if $L_2 W_i^l[:; k] < \gamma$:

7:     end for

8: end for

Step 2. Do Column-based Row Block Pruning:

9: Divide $W^{lnew}$ into $Num_c$ number of columns where the weight matrix are represented by $W_{0,:}^{lnew}$, $W_{1,:}^{lnew}$, $\ldots W_{Num_c,:}^{lnew}$:

10: for block $j \in [1, Num_c]$ do

11:     Compute the $L_2$ norm of each row in $W_j^{lnew}$;

12:     Find the threshold $\zeta^*$ such that for rows whose $L_2$ norm less than the threshold should be pruned to achieve the target sparsity level $p_r$;

13:     for row $r = 0, 1, \ldots (m-1)$ do

14:         $Z_j^l[r; :] = 0$ if $L_2 W_j^{lnew}[r; :] < \zeta$:

15:     end for

16: end for

| Method | PER (%) (baseline - pruned) | PER Degrad. | Column Compress. Rate | Row Compress. Rate | Para. No. | Overall Compress. Rate |
|---|---|---|---|---|---|---|
| ESE [9] | 20.40 - 20.70 | 0.30 | - | - | 0.37M | 8× |
| C-LSTM [10] | 24.15 - 24.57 | 0.42 | - | - | 0.41M | 8× |
| C-LSTM [10] | 24.15 - 25.48 | 1.33 | - | - | 0.20M | 16× |
| BBS [26] | 23.50 - 23.75 | 0.25 | - | - | 0.41M | 8× |
| Wang [27] | - | 0.91 | - | - | 0.81M | 4× |
| E-RNN [28] | 20.02 - 20.20 | 0.18 | - | - | 1.20M | 8× |
| BSP (ours) | 18.80 (w/o pruning) | 0 | 1 | 1 | 9.6M | 1× |
| BSP (ours) | 18.80 - 18.80 | 0 | 10 | 1 | 0.96M | 10× |
| BSP (ours) | 18.80 - 19.40 | 0.60 | 16 | 1.25 | 0.48M | 19× |
| BSP (ours) | 18.80 - 19.60 | 0.80 | 16 | 2 | 0.33M | 29× |
| BSP (ours) | 18.80 - 20.60 | 1.80 | 16 | 5 | 0.22M | 43× |
| BSP (ours) | 18.80 - 21.50 | 2.70 | 20 | 8 | 0.12M | 80× |
| BSP (ours) | 18.80 - 23.20 | 4.40 | 16 | 16 | 0.09M | 103× |
| BSP (ours) | 18.80 - 24.20 | 5.40 | 20 | 10 | 0.06M | 153× |
| BSP (ours) | 18.80 - 24.20 | 5.40 | 20 | 16 | 0.04M | 245× |
| BSP (ours) | 18.80 - 25.50 | 6.70 | 20 | 20 | 0.03M | 301× |

FIG. 6

| Compression Rate | GOP | GPU Time / Frame (us) | GPU GOP/s | GPU Energy Efficiency (normalized with ESE) | CPU Time / Frame (us) | CPU GOP/s | CPU Energy Efficiency (normalized with ESE) |
|---|---|---|---|---|---|---|---|
| 1× (baseline) | 0.5800 | 3590.12 | 161.55 | 0.88 | 7130.00 | 81.35 | 0.25 |
| 10× | 0.0580 | 495.26 | 117.11 | 6.35 | 1210.20 | 47.93 | 1.48 |
| 19× | 0.0330 | 304.11 | 108.51 | 10.35 | 709.33 | 46.52 | 2.52 |
| 29× | 0.0207 | 233.89 | 88.29 | 13.45 | 464.73 | 44.43 | 3.85 |
| 43× | 0.0143 | 186.05 | 76.86 | 16.91 | 344.77 | 41.48 | 5.19 |
| 80× | 0.0080 | 130.00 | 61.54 | 24.2 | 218.01 | 36.70 | 8.20 |
| 103× | 0.0060 | 109.76 | 54.66 | 28.67 | 202.72 | 29.59 | 8.82 |
| 153× | 0.0039 | 97.11 | 40.16 | 32.4 | 170.74 | 22.84 | 10.47 |
| 245× | 0.0028 | 81.64 | 34.30 | 38.54 | 151.28 | 18.51 | 11.82 |
| 301× | 0.0020 | 79.13 | 25.27 | 39.76 | 145.93 | 13.71 | 12.25 |

FIG. 7

COMPUTER-IMPLEMENTED METHODS AND SYSTEMS FOR COMPRESSING RECURRENT NEURAL NETWORK (RNN) MODELS AND ACCELERATING RNN EXECUTION IN MOBILE DEVICES TO ACHIEVE REAL-TIME INFERENCE

CROSS REFERENCE TO RELATED APPLICATION APPLICATIONS

This application is a national phase entry under 35 USC § 371 of International Application No. PCT/US21/14866 filed Jan. 25, 2021 entitled COMPUTER-IMPLEMENTED METHODS AND SYSTEMS FOR COMPRESSING RECURRENT NEURAL NETWORK (RNN) MODELS AND ACCELERATING RNN EXECUTION IN MOBILE DEVICES TO ACHIEVE REAL-TIME INFERENCE, which claims priority from U.S. Provisional Patent Application No. 62/965,275 filed on 24 Jan. 2020 entitled RTMO-BILE: A MOBILE ACCELERATION FRAMEWORK OF RNNS FOR BEYOND REAL-TIME SPEECH RECOGNITION. The entire contents of these applications are incorporated herein by reference in their entirety.

GOVERNMENT SUPPORT

This invention was made with government support under Grant No. 1739748 awarded by the National Science Foundation. The government has certain rights in the invention.

BACKGROUND

The present application relates to a recurrent neural network (RNN) acceleration framework that leverages both a block-based pruning approach and compiler optimizations to accelerate RNN inference on mobile devices.

BRIEF SUMMARY OF THE DISCLOSURE

In accordance with one or more embodiments, a computer-implemented method is disclosed for compressing a recurrent neural network (RNN) model and accelerating RNN execution in a mobile device to achieve real-time inference. The method includes the steps of: (a) performing a block-based structured pruning of weights in a weight matrix of the RNN model through row-based column block pruning and column-based row pruning to generate a compressed RNN model; and (b) applying a compiler-assisted RNN acceleration framework to the compressed RNN model to generate code to be executed on the mobile device to accelerate RNN inference.

BRIEF DESCRIPTION OF THE DRAWINGS

FIG. 5 shows an exemplary algorithm for block-based structured pruning in accordance with one or more embodiments.

FIGS. 6 and 7 show Tables I and II, respectively.

DETAILED DESCRIPTION

Figure 1:
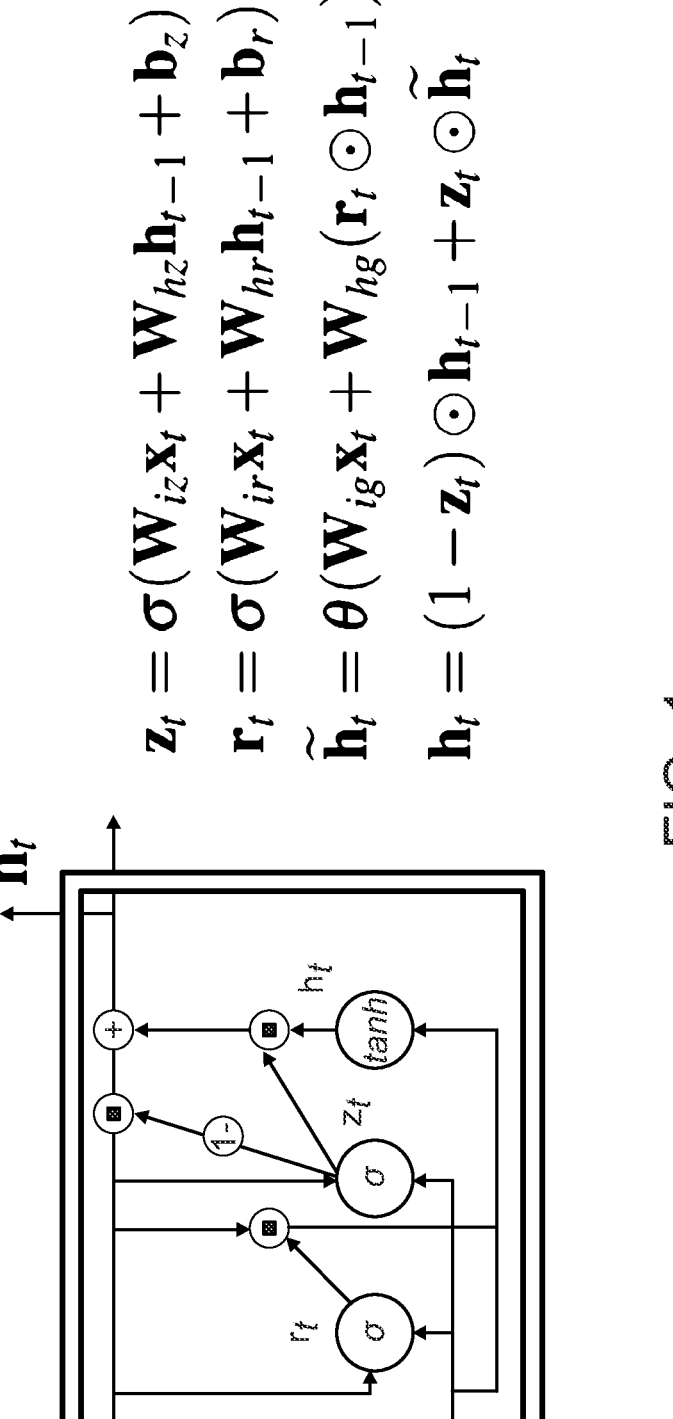
FIG. 1 illustrates an exemplary single GRU model.

Deep neural networks (DNNs) have become the state-of-the-art technique due to their high prediction accuracy in many artificial intelligence tasks, such as image recognition and characterization [1], speech recognition [2], and recommendation system [3]. Among various DNN architectures, recurrent neural networks (RNNs) are widely used for speech recognition tasks because they can contain cycles to carry information across neurons when reading inputs. For instance, Gated Recurrent Units (GRUs) [4], recent and popular type of RNNs, achieve great success in automatic speech recognition. In recent years, executing DNNs on mobile platforms has become increasingly popular because many high-end mobile devices are emerging. Several recent studies have proposed techniques to accelerate large-scale DNNs in the mobile environment. However, due to fairly high computation complexity and memory consumption when executing RNNs, it is very challenging to deploy RNNs on current embedded processors in mobile devices to achieve real-time inference. (Real-time inference usually means 30 frames per second.)

DNN model compression provides an effective way to mitigate the computation and memory challenges brought by DNNs. Many model compression techniques have been studied in recent years. For example, weight pruning can provide a notable reduction ratio in the size of models. Early work [5] on non-structured weight pruning eliminates weights at arbitrary locations, which leads to the pruned model to be stored in a sparse matrix format, such as the compressed sparse column (CSC) format. Non-structured weight pruning, however, hurts processing throughput because the indices in the compressed weight representation result in stalls or GPUs and FPGAs. On the other hand, structured weight pruning [6] is more hardware friendly. By exploiting filter pruning [7] and channel pruning [8], the pruned model is more regular in terms of the shape, which can eliminate storing the weight indices. However, structured pruning reduces accuracy more than non-structured pruning. Moreover, state-of-the-art model-compression-based RNN acceleration techniques such as ESE [9] and C-LSTM still suffer from limited inference accuracy and processing throughput, which keeps them from being implemented on mobile devices. Furthermore, existing DNN acceleration frameworks for mobile devices such as TVM do not even support RNN. Therefore, in order to achieve real-time inference for RNNs on mobile devices, an end-to-end RNN acceleration framework is desired that can achieve both high inference accuracy and high computational efficiency.

The present application discloses a real-time RNN acceleration framework for mobile devices referred to herein as RTMobile. RTMobile is composed of two main components: block-based structured pruning and compiler-assisted performance optimization. Unlike traditional structured pruning methods used on DNNs, the novel block-based structured pruning approach provides a finer pruning granularity to maintain high inference accuracy, while significantly reducing the RNN model size. We also propose several compiler-based optimization techniques to determine the block size and generate the optimal code on mobile devices. Briefly, we propose the following:

(1) A novel RNN acceleration framework for mobile devices (RTMobile), which achieves real-time RNN inference on mobile devices.

(2) A fine-grained Block-based Structured Pruning (BSP) algorithm for both high inference accuracy and high computational efficiency.

(3) A series of compiler-based optimization techniques to further accelerate RNN inference on mobile platforms, including matrix reorder, load redundant elimination, and a new compact data format for pruned model storage (referred to herein as Block-based Structured Pruning Compact (BSPC) format).

We compare RTMobile with multiple state-of-the-art methods based on a representative RNN (GRU) using a well-known speech recognition dataset. Evaluation results demonstrate that RTMobile can compress the GRU model by over 10× without losing accuracy. Experiments also illustrate that RTMobile can obtain about 50× energy-efficiency improvement over prior work with the same inference time.

BACKGROUND

Background information about GRU, DNN model compression, and DNN mobile acceleration framework is presented below.

A. Gated Recurrent Unit

The Gated Recurrent Unit (GRU) is a variation of the long short-term memory (LSTM) model proposed by Cho et al. [4]. It combines the forget and input gates into a single "update gate". It also merges the cell state and hidden state, and makes some other changes. The resulting GRU model is simpler than standard LSTM models, and has been growing increasingly popular. FIG. 1 shows a single GRU, whose functionality is derived by using the following equations iteratively from t=1 to T, where symbols z, r, he, h are respectively the update gate, output gate, cell state, and cell output. As the GRU is a more advanced version of RNN than LSTM, we mainly focus on the GRU model herein.

B. DNN Model Compression Techniques

As a representative technique in DNN model compression, DNN weight pruning removes the redundant or less important weights to reduce the storage and computational costs for the inference phase. There are two mainstream ways of weight pruning: non-structured pruning and structured pruning.

Non-structured pruning: Non-structured weight pruning is fine-grained and prunes weights at arbitrary locations. The early work proposed by Han et al. leverages a heuristic method to iteratively prune weights with small magnitudes. With the successful application of the powerful Alternating Direction Method of Multipliers (ADMM) optimization framework, existing research works [13], [14] achieve a very high weight reduction ratio while maintaining promising accuracy. However, non-structured methods lead to sparse and irregular weight matrices, which require indices to be stored in a compressed format. Though saving the storage cost, the decoding of each stored index involves a search over the whole activation vector. Consequently, it suffers from limited acceleration in actual hardware implementation [9].

Figure 2A:
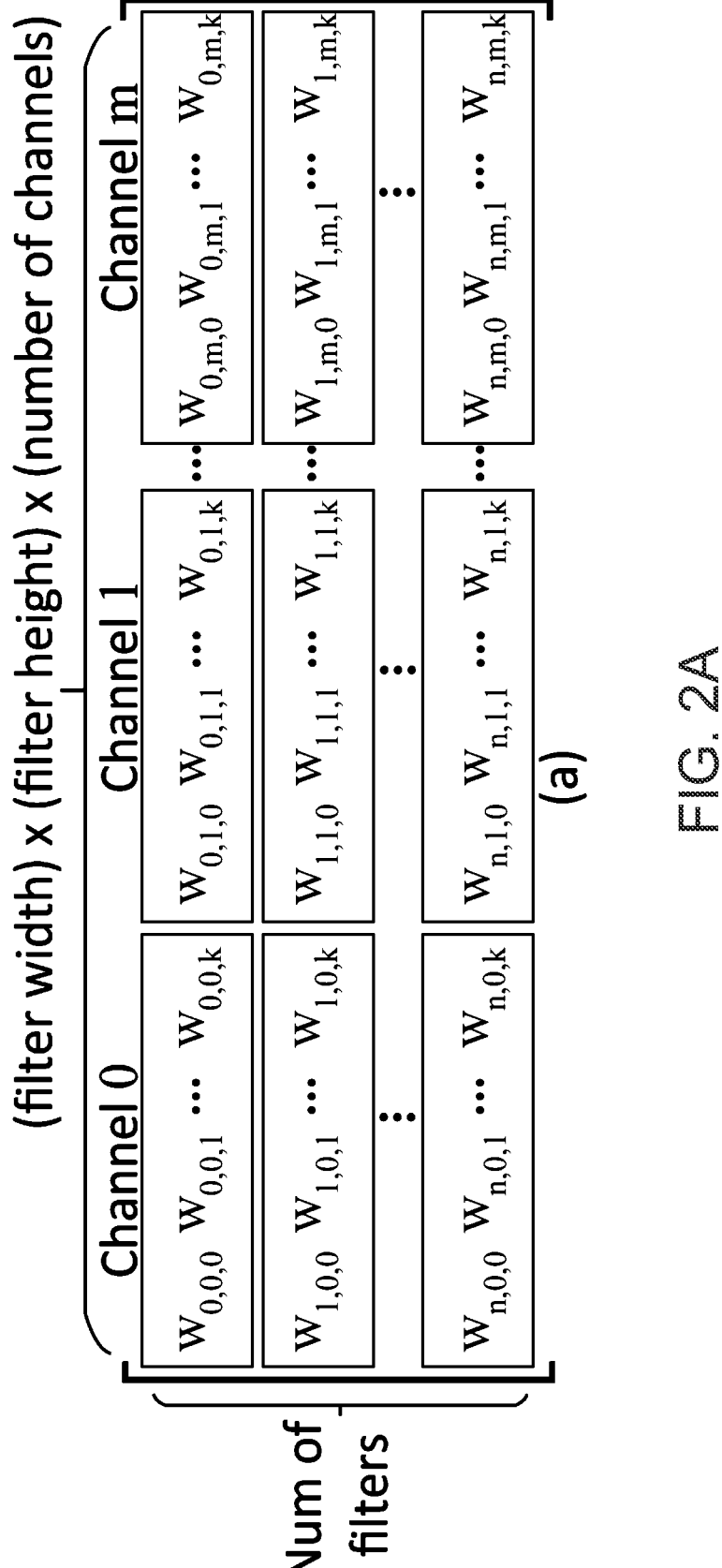
FIG. 2A shows a weight tensor representation of a CONY layer is transformed into the weight matrix representation.
Figure 2B:
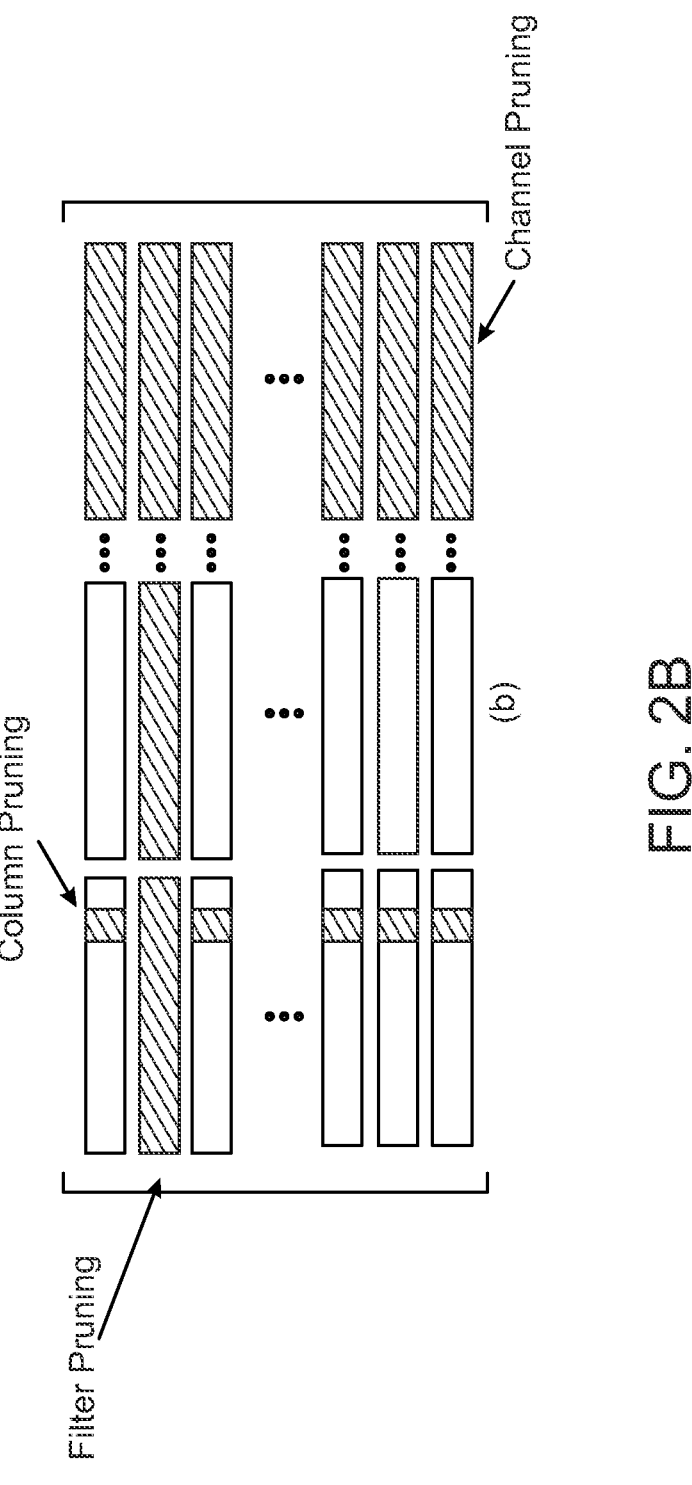
FIG. 2B shows how different structured weight pruning schemes are implemented on the weight matrix representation.

Structured pruning: To overcome the limitations of non-structured pruning, recent works [6], [8], [15] considered to incorporate regularity in weight pruning with a main focus on the convolutional (CONV) layers of DNNs. Previous works mainly focused on two types of structured pruning: filter pruning and channel pruning. Filter pruning, also known as row pruning, removes the entire filter(s), while channel pruning removes the whole channel(s). FIGS. 2A and 2B illustrate an example of transforming convolutional computation into general matrix multiplication (GEMM) by converting weight tensors and feature map tensors to matrices [16]. In general, structured pruning directly reduces the dimension of a weight matrix and preserves a full matrix format, thereby facilitating hardware implementations. As a downside, the coarse-grained nature of structured pruning reduces the accuracy more significantly.

C. DNN Acceleration on Mobile Devices

Many efforts target accelerating DNN execution on mobile devices in the past few years, including MCDNN [17], DeepMon [18], TFLite [19], TVM [11], and Alibaba Mobile Neural Network [20]. However, most of them do not deeply exploit model compression techniques as RTMobile. In particular, none of the existing frameworks can even support RNN acceleration on mobile devices.

Thus, it is apparent that (i) non-structured pruning has the advantage of very high compression ratio, but is typically not compatible with GPU acceleration for inference; (ii) structured pruning facilitates hardware implementations, but is often subjected to accuracy degradation, especially when it is applied to time-based RNNs. To overcome the limitations of current methods, a more flexible and fine-grained pruning policy is needed. This disclosure specifically focuses on RNN models, which have not been extensively studied.

Related Work

Many existing studies have implemented model compression algorithms for RNN acceleration on FPGAs [9], [10], [21]-[24]. However, the majority of these works focus on constructing new RNN architectures [22] rather than a software and hardware co-design framework. Instead, our RTMobile proposes architecture designs in both software and hardware levels. Below, we discuss and compare RTMobile with two most recent and related approaches: ESE [9] and C-LSTM [10], which not only address the RNN model compression problem on algorithm/software but also take into account the hardware efficiency on hardware (i.e., FPGAs).

A. ESE

ESE proposes an optimized LSTM compression framework on FPGA, which sparses the model through parameter pruning [5], [12]. Compared with both CPU- and GPU-based implementations, ESE achieves higher energy efficiency on FPGA. However, the design of ESE has three main limitations: (1) ESE's irregular pruning method used for model compression causes large overhead when performing read/write operations on hardware; (2) the irregularity of weight matrix storage in ESE results in inefficient implementations of indices that consume extra storage cost, thus the computing power of the FPGA is not fully exerted; and (3) ESE only marginally improves compression ratio taking into account indices.

B. C-LSTM

In order to solve the problem caused by irregular pruning, Wang et al. propose an approach (called C-LSTM) to employ a structured compression technique using block-circulant matrices to compress the LSTM model. With regular structure of the block-circulant matrices, C-LSTM can further reduces both computational and storage complexity compared with ESE. However, the coarse-grained nature of structured pruning also cause relatively significant degradation on the model accuracy. Moreover, the advanced ADMM-based neural network pruning method, which can effectively handle both model compression and accuracy, is not supported in the C-LSTM training because it requires the most advanced optimizer in stochastic gradient decent (e.g., Adam optimizer).

C. ADMM

The pruning problem can be formulated as the minimization of f(W, b)+g(W) by following:

$$\underset{\{W_i\}}{\text{minimize}} \quad f\big(\{W_i, b_i\}_{i=1}^N\big) + g\big(\{W_i\}_{i=1}^N\big), \qquad (1)$$

$$\text{subject to} \qquad W_i \in S_i, i = 1, \dots, N$$

where N is the total number of weight tensors in the recurrent neural network, f(W, b) is the loss function, and g(W) is an indicator function that is zero when the constraint S={the number of nonzero weights is less than certain threshold} is satisfied, but +∞ otherwise.

The augmented Lagrangian formation of problem (1) is $$L_p = \underset{\{W_i\}\}}{\text{minimize}} \quad f\big(\{W_i, b_i\}_{i=1}^N\big) + \sum_{i=1}^N \frac{\rho_i}{2}\|W_i - Z_i + U_i\|_F^2, \qquad (2)$$

where ρi is a penalty value, Zi is pruning mask and Ui is dual variable.

The ADMM algorithm is to iteratively update the indicated pruning mask and retrain the neural network under this mask, until a good mask and neural network converge. It proceed by repeating iteration k=0, 1, . . . as following:

$$W_i^{k+1} := \arg\min_{W_i} L_p(\{W_i\}, \{Z_i^k\}, \{U_i^k\}), \qquad (3)$$

$$Z_i^{k+1} := \arg\min_{Z_i} L_p(\{W_i^{k+1}\}, \{Z_i\}, \{U_i^k\}), \qquad (4)$$

$$U_i^{k+1} := U_i^k + W_i^{k+1} - Z_i^{k+1}. \qquad (5)$$

The pruning mask can be trained by Algorithm 1 shown in FIG. 5.

Rtmobile Framework

An exemplary RTMobile, the mobile acceleration framework for RNNs in accordance with one or more embodiments, is described in further detail below.

A. Block-based Structured Pruning

Figure 3A:
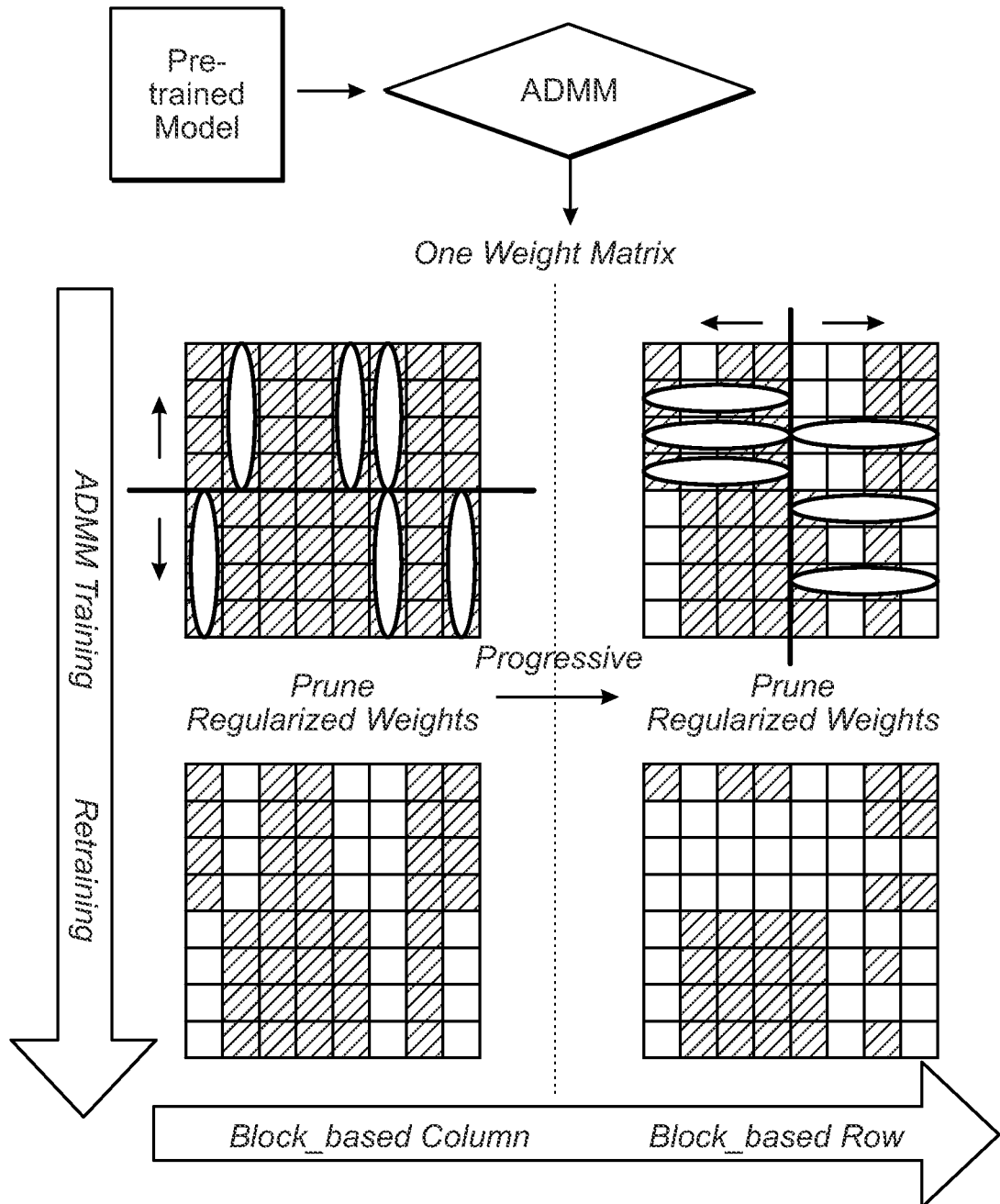
FIGS. 3A, 3B, and 3C illustrate a systematic overview of an exemplary RTMobile acceleration framework in accordance with one or more embodiments.

The Block-based Structured Pruning (BSP) algorithm is used to better facilitate the compression ratio and ensure the structured model architecture for hardware implementations. In general, training a BSP compressed model can be separated into two main steps as depicted in FIG. 3A: Step 1 row-based column block pruning and Step 2 column-based row pruning.

The training process starts with splitting the whole weight matrix W into Num_r rows horizontally. For each row, we divide it into Num_c blocks and then perform the structured pruning using ADMM method (discussed above). Then, we perform column-based row pruning over the entire weight matrix W in the Step 2. Given the constraint of block number after dividing by Num_c and Num_r, the pruned model can achieve a satisfactory performance overhead on hardware.

The training process continues iteratively until all the blocks are pruned. We identify that by doing so, the training performance is stable, and the whole weight matrix after pruning is decentralized. The BSP training approach is summarized in Algorithm 1 (FIG. 5).

B. Compiler-Assisted RNN Acceleration Framework

Figure 3B:
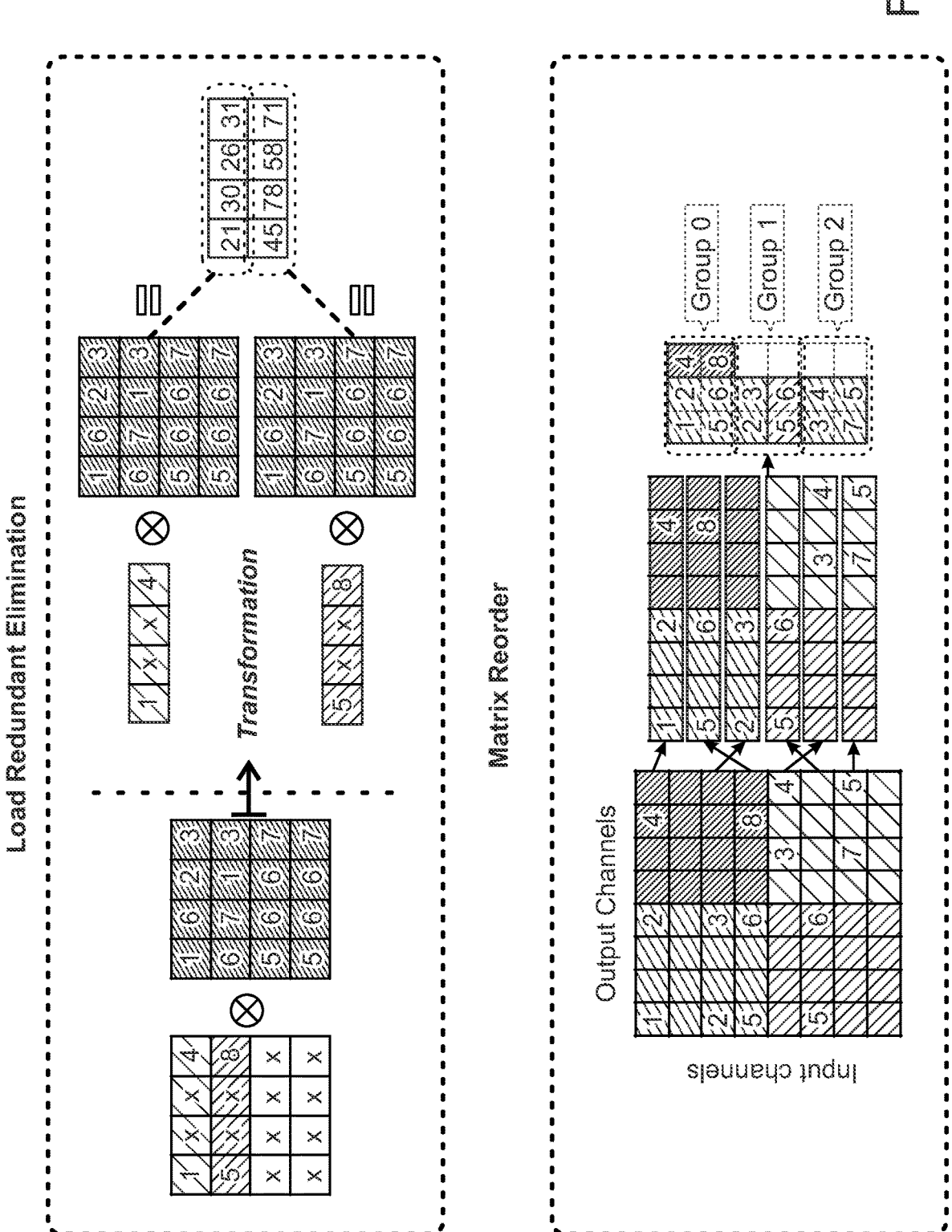
Figure 3C:
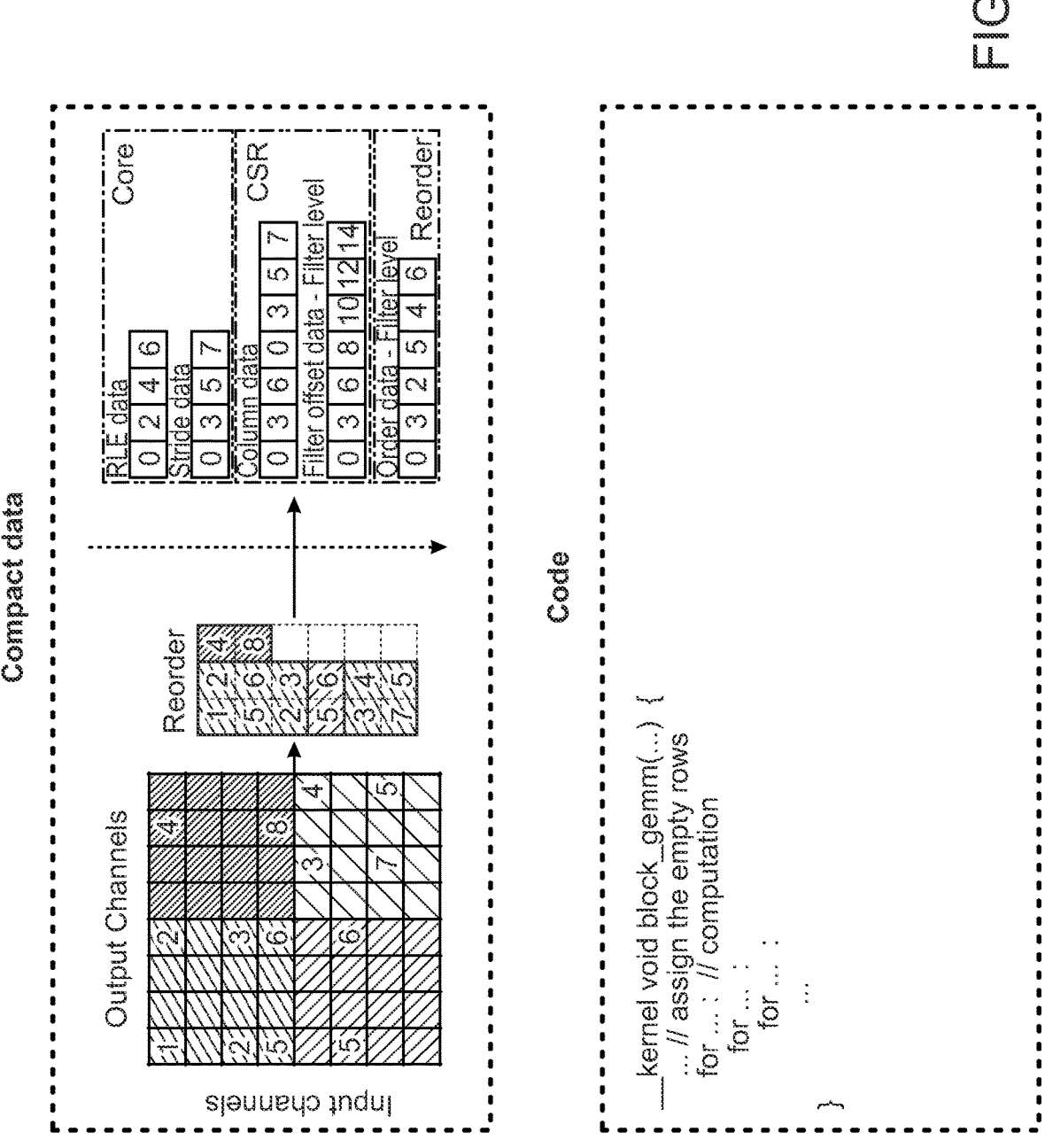

After block-based structured pruning, RTMobile relies on a compiler-assisted RNN acceleration framework to achieve efficient RNN inference on mobile devices. This compiler framework includes three key optimizations that work on each RNN layer (as shown in FIGS. 3B-3C): matrix reorder, load redundancy elimination, and a compact data storage format for pruned RNN matrices, BSPC (i.e., Block-based Structured Pruning Compact format). These optimizations aim to address three key challenges in pruned RNN execution: thread divergence and load imbalance among threads, redundant memory access, and unnecessary zero storage.

a) Matrix reorder: The matrix is executed by multiple CPU/GPU threads simultaneously. Without a further reorder, these threads may execute rows with significantly divergent computations, causing severe load imbalance issue that hurts thread-level parallelism. Therefore, RTMobile introduces a matrix reorder optimization to group the rows with the same (or similar) computation patterns together. After this reorder, the rows in each group are assigned to multiple threads to achieve balanced processing.

b) Redundant load elimination: Within a group, each thread processes multiple continuous rows, offering us an opportunity of eliminating the redundant memory load operations. This optimization is specifically enabled by our block-based structured pruning, because after such pruning, the preserved weights in two neighbor rows may share the same pattern and require the same data in the input feature maps. It is difficult to explore this optimization opportunity for existing unstructured weight pruning due to its irregularity.

c) BSPC format: Our proposed block-based structured pruning also guides us to design a more compact data structure than traditional CSR format (called BSPC format) to store RNN weight matrices. This is because within each block the preserved weights only exist in certain rows and columns, enabling to further compact the index array in CSR. The BSPC format also includes the matrix reorder information to match the corresponding input feature map with the weight matrix. The BSPC format significantly reduces the memory footprint thus alleviating the memory-bound issue in RNN execution.

In addition to above optimizations, our compiler framework also includes an auto-tuning component to perform an offline search of the best execution configurations like the matrix tiling size, unrolling size, memory placement, etc. In particular, we employ it to find the best block size that results in an optimal combination of accuracy and performance.

Experimental Evaluation

In this section, we evaluate RTMobile by comparing it with several state-of-the-art methods. There are three evaluation objectives: 1) comparing RTMobile with other model compression methods and demonstrating that our method outperforms others in both compression rate and accuracy; 2) showing RTMobile has both higher computational efficiency and energy efficiency than a well-known deployment on FPGA (ESE [9]); and 3) studying the relationship between compression rate and inference execution time. We compare RTMobile on mobile with ESE on FPGA because (1) none of the existing RNN acceleration works supports mobile device, and (2) ESE provides one of the highest inference accuracy among prior works.

A. Experiment Setup

Experimental Platform. We conduct our experiments using a Samsung Galaxy S10 with the latest Qualcomm Snapdragon 855 mobile platform, which consists of a Qualcomm Kryo 485 Octa-core CPU and a Qualcomm Adreno 640 GPU.

Model Architecture. We evaluate RTMobile and compare it with the state-of-the-art methods on the popular GRU RNN model, which has been widely used in previous studies [9], [10], [28]. The GRU model contains 2 GRU layers and about 9.6 M overall number of parameters.

Evaluation Dataset. We conduct our experiments on the TIMIT dataset [29], which is widely adopted for evaluating automatic speech recognition systems. The TIMIT dataset contains broadband recordings from 630 speakers reading ten phonetically rich sentences in eight major dialects of American English, each reading ten phonetically rich sentences.

B. Evaluation Results and Discussion

Compression Rate and Accuracy. Table I (FIG. 6) illustrates the results (including phone error rate and number of preserved parameters) of RTMobile with different compression rates and the comparison with other state-of-the-art methods, including ESE [9], C-LSTM [10], BBS [26], Wang and E-RNN [28]. For a fair comparison, we train all models using the same TIMIT dataset [29]. Benefit from the most advanced PyTorch-Kaldi Speech Recognition Toolkit [30], the baseline GRU model for our RTMobile can achieve higher recognition accuracy than the other methods before pruning, e.g., our PER is 5.35% lower than C-LSTM's (18.80% v.s. 24.15%).

We observe that our proposed BSP method can guarantee no accuracy degradation when the compression rate is not higher than 10×, which is superior than ESE and C-LSTM from both compression rate and inference accuracy. We also observe that BSP can stably keep a high accuracy compared to the other methods when the compression rate is relatively high. For instance, when the compression rate is 103×, the BSP pruned model can even outperform the C-LSTM baseline model in terms of both compression rate and accuracy. The C-LSTM baseline model (with 3.25 M parameters) has 36× more parameters than our BSP pruned model, but its PER is 0.95% higher than ours (24.15% vs. 23.20%). In addition, we use BSP to further prune the model until the rate of 301× and observe that our method can well adapt to ultra-high compression rate scenario. For example, our model with 245× compression rate can still maintain the same-level PER as the C-LSTM baseline model (24.20% vs. 24.15%) and reduce the parameter number by over 80× (0.04 M vs. 3.25 M).

Inference Time and Energy Efficiency. Table II (FIG. 7) presents the evaluation results of RTMobile's inference time, Giga Operations Per Second (GOP/s), and energy efficiency (normalized with ESE method) on mobile GPU and CPU, respectively. The table illustrates that, when the compression rate is higher than 245×, RTMobile can outperform in energy efficiency by about 40× compared with ESE while maintaining the same inference time (ESE's inference time is 82.7 us) on the mobile GPU (ESE uses a large FPGA platform of 41 W power, and thus it is easier to achieve higher energy efficiency than speed). Please note that this is a clear feat, as it is typically perceived that FPGA is more energy-efficient than general-purpose computing devices. This is because of two main reasons. First, comparing to ESE's activation calculation by look-up tables that results in limited parallelization and irregular memory accesses (two key performance factors on FPGA), RTMobile's compiler optimizations significantly improve both the parallelization and memory performance. Second, RTMobile has a much better compression rate (with a negligible accuracy loss), resulting in a more significant computation reduction. Although our compression rates are significant, we must emphasize that the inefficiency in FPGA implementation in ESE (especially activation) plays an equally important, if not more, role. As can be seen from the table, our GPU energy efficiency (frames in unit energy) is almost the same as ESE (which uses compression) even when we do not have any pruning. With increase in the compression rate, the computation pattern becomes I/O and memory bounded, the memory access pattern becomes more irregular, which leads to lower CPU/GPU GOP/s.

Figure 4:
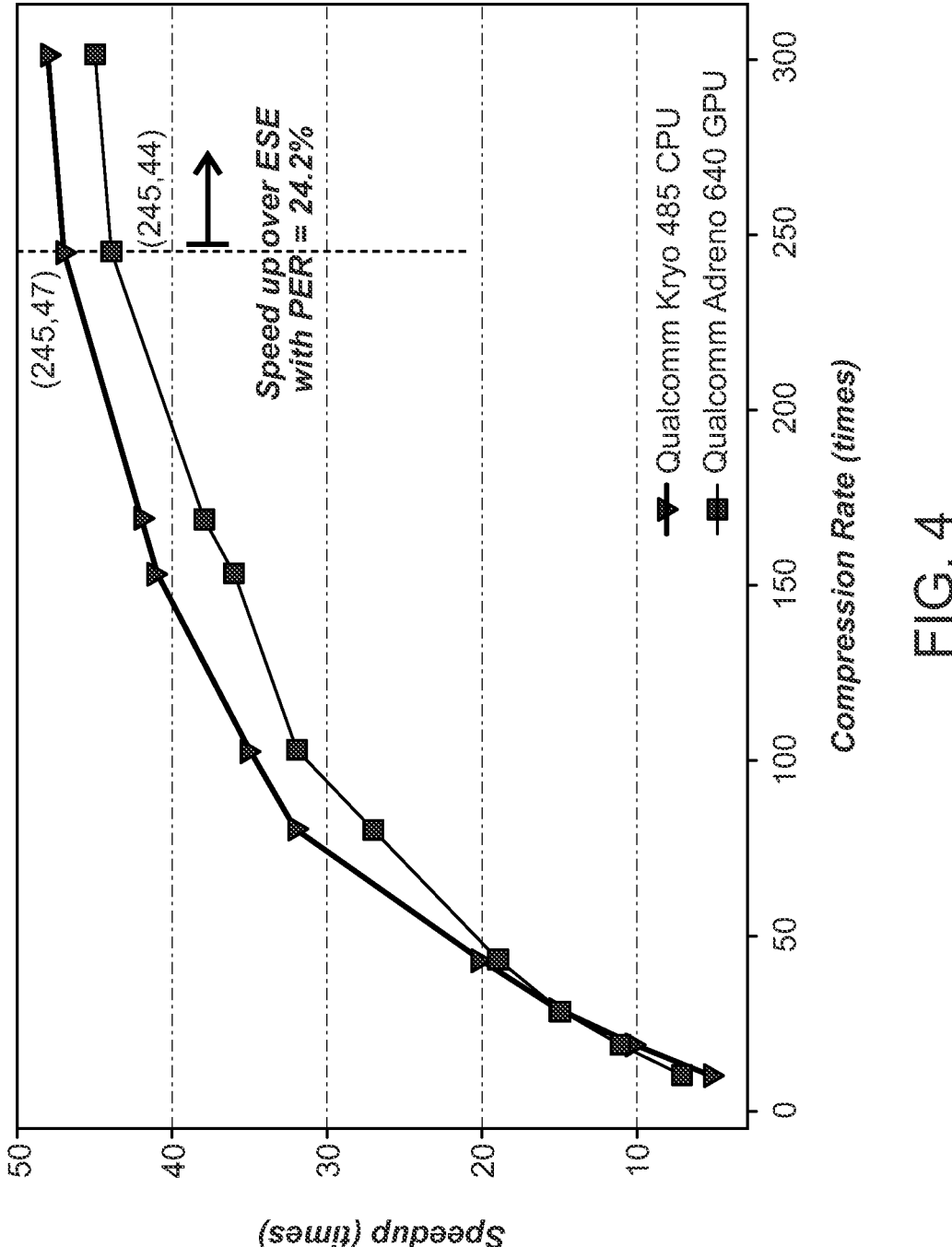
FIG. 4 is a graph illustrating speedup using RTMobile with different rates on mobile devices.

Relationship between Compression Rate and Inference Time. FIG. 4 further illustrates the relationship between inference time and compression rate. The inference time is in the form of speedups over our own dense CPU/GPU baselines, respectively. The speedup grows as compression rate increases. The speedup becomes stable when compression rate reaches to a certain range (e.g., compression rate reaches 250×). When the compression rate is 245×, our inference time on mobile GPU is the same to ESE's on FPGA.

Figure 8:
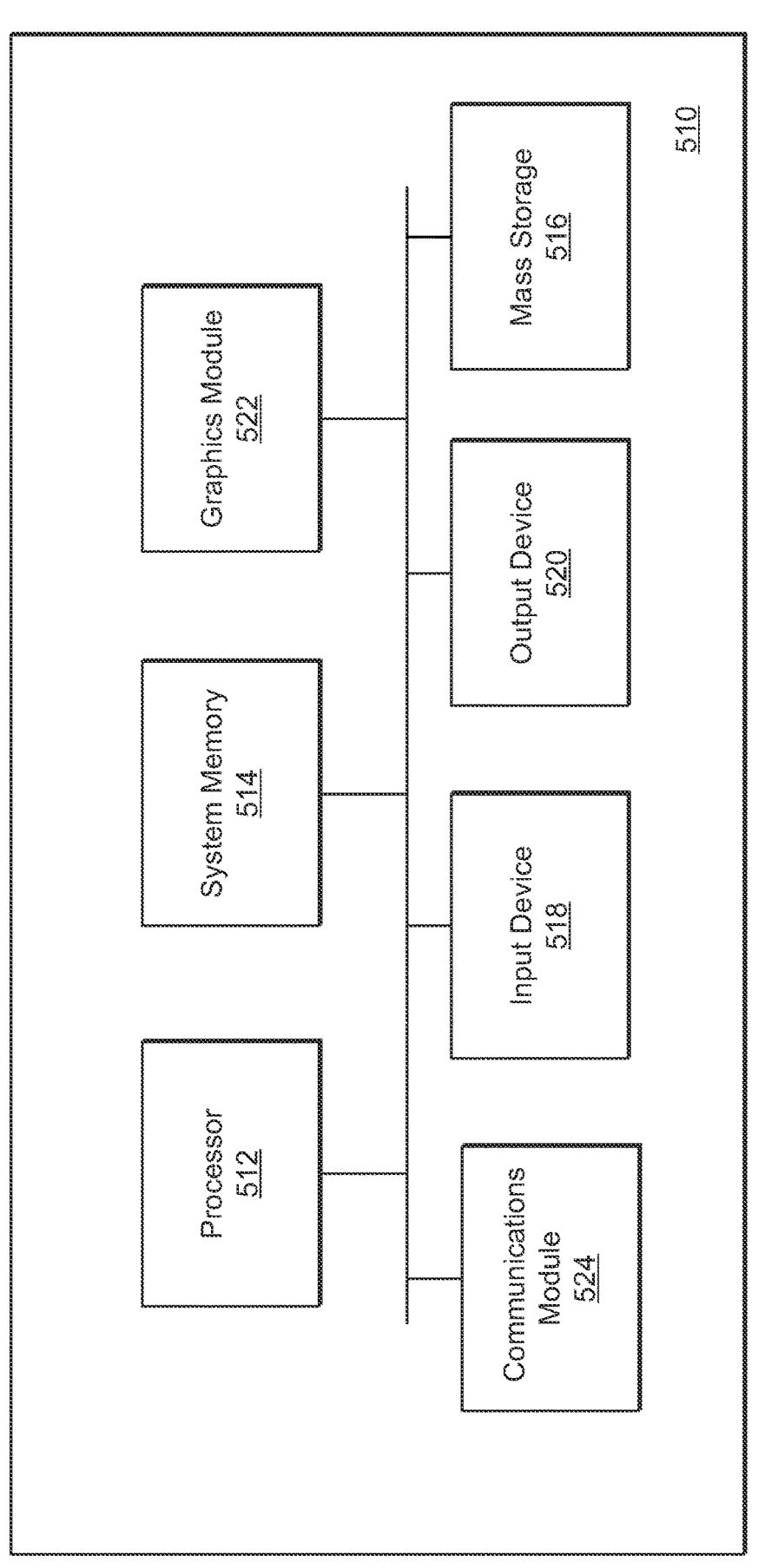
FIG. 8 is a block diagram illustrating an exemplary computer system in which the methods described herein in accordance with one or more embodiments can be implemented.

The methods, operations, modules, and systems described herein for compressing a recurrent neural network (RNN) model and accelerating RNN execution may be implemented in one or more computer programs executing on a programmable computer system. FIG. 8 is a simplified block diagram illustrating an exemplary computer system 510, on which the one or more computer programs may operate as a set of computer instructions. The computer system 510 includes, among other things, at least one computer processor 512, system memory 514 (including a random access memory and a read-only memory) readable by the processor 512. The computer system 510 also includes a mass storage device 516 (e.g., a hard disk drive, a solid-state storage device, an optical disk device, etc.). The computer processor 512 is capable of processing instructions stored in the system memory or mass storage device. The computer system additionally includes input/output devices 518, 520 (e.g., a display, keyboard, pointer device, etc.), a graphics module 522 for generating graphical objects, and a communication module or network interface 524, which manages communication with other devices via telecommunications and other networks.

Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

REFERENCES

[1] A. Krizhevsky and G. Hinton, "Learning multiple layers of features from tiny images," 2009.

[2] R. Collobert and J. Weston, "A unified architecture for natural language processing: Deep neural networks with multitask learning," in ICML. ACM, 2008, pp. 160-167.

[3] H. Wang, N. Wang, and D.-Y. Yeung, "Collaborative deep learning for recommender systems," in KDD. ACM, 2015, pp. 1235-1244.

[4] K. Cho, B. Van Merrienboer, D. Bahdanau, and Y. Bengio, "On the properties of neural machine translation: Encoder-decoder approaches," ar Xiv preprint arXiv: 1409.1259, 2014.

[5] S. Han, H. Mao, and W. J. Dally, "Deep compression: Compressing deep neural networks with pruning, trained quantization and huffman coding," arXiv preprint arXiv: 1510.00149, 2015.

[6] W. Wen, C. Wu, Y. Wang, Y. Chen, and H. Li, "Learning structured sparsity in deep neural networks," in NIPS, 2016, pp. 2074-2082.

[7] Y. He, G. Kang, X. Dong, Y. Fu, and Y. Yang, "Soft filter pruning for accelerating deep convolutional neural networks," in IJCAI, 2018, pp. 2234-2240.

[8] Y. He, X. Zhang, and J. Sun, "Channel pruning for accelerating very deep neural networks," in ICCV. IEEE, 2017, pp. 1398-1406.

[9] S. Han, J. Kang, H. Mao, Y. Hu, X. Li, Y. Li, D. Xie, H. Luo, S. Yao, Y. Wang, H. Yang, and W. J. Dally, "Ese: Efficient speech recognition engine with sparse lstm on fpga." in FPGA, 2017, pp. 75-84.

[10] S. Wang, Z. Li, C. Ding, B. Yuan, Q. Qiu, Y. Wang, and Y. Liang, "C-lstm: Enabling efficient lstm using structured compression techniques on fpgas," in FPGA. ACM, 2018, pp. 11-20.

[11] T. Chen, T. Moreau, Z. Jiang, L. Zheng, E. Yan, H. Shen, M. Cowan, L. Wang, Y. Hu, L. Ceze et al., "TVM: An automated end-to-end optimizing compiler for deep learning," in OSDI, 2018.

[12] S. Han, J. Pool, J. Tran, and W. Dally, "Learning both weights and connections for efficient neural network," in NIPS, 2015, pp. 1135-1143.

[13] T. Zhang, S. Ye, Y. Zhang, Y. Wang, and M. Fardad, "Systematic weight pruning of dnns using alternating direction method of multipliers," ar Xiv preprint arXiv: 1802.05747, 2018.

[14] A. Ren, T. Zhang, S. Ye, W. Xu, X. Qian, X. Lin, and Y. Wang, "Admm-nn: an algorithm-hardware co-design framework of dnns using alternating direction methods of multipliers," in ASPLOS, 2019.

[15] C. Min, A. Wang, Y. Chen, W. Xu, and X. Chen, "2pfpce: Two-phase filter pruning based on conditional entropy," arXiv preprint arXiv: 1809.02220, 2018.

[16] S. Chetlur, C. Woolley, P. Vandermersch, J. Cohen, J. Tran, B. Catanzaro, and E. Shelhamer, "cudnn: Efficient primitives for deep learning," ar Xiv preprint arXiv: 1410.0759, 2014.

[17] S. Han, H. Shen, M. Philipose, S. Agarwal, A. Wolman, and A. Krishnamurthy, "Mcdnn: An approximation-based execution framework for deep stream processing under resource constraints," in MobiSys. ACM, 2016, pp. 123-136.

[18] L. N. Huynh, Y. Lee, and R. K. Balan, "Deepmon: Mobile gpu-based deep learning framework for continuous vision applications," in MobiSys. ACM, 2017, pp. 82-95.

[19] https://www.tensorflow.org/mobile/tflite/.

[20] https://github.com/alibaba/MNN.

[21] S. Li, C. Wu, H. Li, B. Li, Y. Wang, and Q. Qiu, "Fpga acceleration of recurrent neural network based language model," in FCCM. IEEE, 2015, pp. 111-118.

[22] E. Nurvitadhi, J. Sim, D. Sheffield, A. Mishra, S. Krishnan, and D. Marr, "Accelerating recurrent neural networks in analytics servers: Comparison of fpga, cpu, gpu, and asic," in FPL. IEEE, 2016, pp. I-4.

[23] Y. Guan, Z. Yuan, G. Sun, and J. Cong, "Fpga-based accelerator for long short-term memory recurrent neural networks," in ASP-DAC. IEEE, 2017, pp. 629-634.

[24] Z. Li, C. Ding, S. Wang, W. Wen, Y. Zhuo, C. Liu, Q. Qiu, W. Xu, X. Lin, X. Qian et al., "E-rnn: Design optimization for efficient recurrent neural networks in fpgas," in 25th IEEE International Symposium on High Performance Computer Architecture, HPCA 2019. Institute of Electrical and Electronics Engineers Inc., 2019, pp. 69-80.

[25] S. Boyd, N. Parikh, E. Chu, B. Peleato, and J. Eckstein, "Distributed optimization and statistical learning via the alternating direction method of multipliers," Foundations and Trends® in Machine Learning, vol. 3, no. 1, pp. 1-122, 2011.

[26] S. Cao, C. Zhang, Z. Yao, W. Xiao, L. Nie, D. Zhan, Y. Liu, M. Wu, and L. Zhang, "Efficient and effective sparse lstm on fpga with bank-balanced sparsity," in FPGA. ACM, 2019, pp. 63-72.

[27] S. Wang, P. Lin, R. Hu, H. Wang, J. He, Q. Huang, and S. Chang, "Acceleration of lstm with structured pruning method on fpga," IEEE Access, vol. 7, pp. 62 930-62 937, 2019.

[28] Z. Li, C. Ding, S. Wang, W. Wen, Y. Zhuo, X. Lin, X. Qian, and Y. Wang, "E-rnn: design optimization for efficient recurrent neural networks in fpgas," in HPCA. IEEE, 2019.

[29] J. S. Garofolo, L. F. Lamel, W. M. Fisher, J. G. Fiscus, D. S. Pallett, N. L. Dahlgren, and V. Zue, "Timit acoustic-phonetic continuous speech corpus," Linguistic data consortium, vol. 10, no. 5, p. 0, 1993.

[30] M. Ravanelli, T. Parcollet, and Y. Bengio, "The pytorch-kaldi speech recognition toolkit," in In Proc. of ICASSP, 2019.

The invention claimed is:

1. A computer-implemented method for compressing a recurrent neural network (RNN) model and accelerating RNN execution in a mobile device to achieve real-time inference, the method comprising the steps of:

performing a block-based structured pruning of weights in a weight matrix of the RNN model through row-based column block pruning and column-based row pruning to generate a pruned RNN model; and applying a compiler-assisted RNN model acceleration framework to the compressed RNN model to generate code to be executed on the mobile device to accelerate RNN inference, wherein said applying comprises reordering rows of the weight matrix of the pruned RNN model such that a plurality of groups are formed, wherein each group of the plurality of groups comprises a plurality of rows, wherein the plurality of rows of each group are adjacent and have the same pattern, and the code comprises instructions for loading, for each group, a portion of an input feature map for use by the plurality of rows of that group, thereby performing load redundancy elimination optimization.

2. The method of claim 1, wherein the compiler-assisted RNN acceleration framework performs compiler-assisted performance optimizations on the compressed RNN model including a compact data format optimization.

3. The method of claim 2, wherein the compact data format optimization provides a compact data structure to store RNN weight matrices.

4. The method of claim 3, wherein the compact data structure has a Block-based Structured Pruning Compact format, wherein the compact data structure comprises a register load array, a stride array, a column index array, a filter offset array, and a reorder array.

5. The method of claim 1, wherein said performing the block-based structured pruning comprises using an Alternating Direction Method of Multipliers (ADMM) pruning technique.

6. The method of claim 1, wherein the RNN model comprises a Gated Recurrent Unit (GRU) model.

7. The method of claim 1, wherein the RNN model is used in an application for real-time speech recognition, natural language processing (NLP), human-machine interaction, or image recognition and characterization.

8. A computer system, comprising:

at least one processor;

memory associated with the at least one processor; and a program supported in the memory for compressing a recurrent neural network (RNN) model and accelerating RNN execution in a mobile device to achieve real-time inference, the program containing a plurality of instructions which, when executed by the at least one processor, cause the at least one processor to:

perform a block-based structured pruning of weights in a weight matrix of the RNN model through row-based column block pruning and column-based row pruning to generate a compressed RNN model; and apply a compiler-assisted RNN acceleration framework to the compressed RNN model to generate code to be executed on the mobile device to accelerate RNN inference, wherein:

said applying comprises reordering rows of the weight matrix of the pruned RNN model such that a plurality of groups are formed, wherein each group of the plurality of groups comprises a plurality of rows, wherein the plurality of rows of each group are adjacent and have the same pattern, and the code comprises instructions for loading, for each group, a portion of an input feature map for use by the plurality of rows of that group, thereby performing load redundancy elimination optimization.

9. The system of claim 8, wherein the compiler-assisted RNN acceleration framework performs compiler-assisted performance optimizations on the compressed RNN model including a compact data format optimization.

10. The system of claim 9, wherein the compact data format optimization provides a compact data structure to store RNN weight matrices.

11. The system of claim 10, wherein the compact data structure has a Block-based Structured Pruning Compact format, wherein the compact data structure comprises a register load array, a stride array, a column index array, a filter offset array, and a reorder array.

12. The system of claim 8, wherein said performing the block-based structured pruning comprises using an Alternating Direction Method of Multipliers (ADMM) pruning technique.

13. The system of claim 8, wherein the RNN model comprises a Gated Recurrent Unit (GRU) model.

14. The system of claim 8, wherein the RNN model is used in an application for real-time speech recognition, natural language processing (NLP), human-machine interaction, or image recognition and characterization.

* * * * *